US009880858B2

(12) United States Patent
Venkatasubba et al.

(10) Patent No.: US 9,880,858 B2
(45) Date of Patent: Jan. 30, 2018

(54) SYSTEMS AND METHODS FOR REDUCING BIOS REBOOTS

(71) Applicant: Dell Products L.P., Round Rock, TX (US)

(72) Inventors: Karthik Venkatasubba, Bangalore (IN); Elie Antoun Jreij, Pflugerville, TX (US); Wei Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 110 days.

(21) Appl. No.: 14/749,706

(22) Filed: Jun. 25, 2015

(65) Prior Publication Data

US 2016/0378509 A1 Dec. 29, 2016

(51) Int. Cl.
*G06F 9/46* (2006.01)
*G06F 9/44* (2006.01)
*G06F 13/10* (2006.01)
*G06F 9/50* (2006.01)

(52) U.S. Cl.
CPC .............. *G06F 9/4411* (2013.01); *G06F 9/50* (2013.01); *G06F 13/10* (2013.01)

(58) Field of Classification Search
None
See application file for complete search history.

(56) References Cited

U.S. PATENT DOCUMENTS

| | | | | |
|---|---|---|---|---|
| 5,968,173 A * | 10/1999 | Watts, Jr. | ............. | G06F 9/4401 713/2 |
| 8,621,481 B2 * | 12/2013 | Fu | ......................... | G06F 9/4411 709/223 |
| 8,977,733 B1 * | 3/2015 | Phuong | ............... | H04L 41/0813 709/220 |
| 2005/0223383 A1 * | 10/2005 | Tetrick | .................. | G06F 9/5011 718/104 |
| 2012/0017074 A1 * | 1/2012 | Kelly | .................... | G06F 9/4411 713/100 |
| 2016/0011879 A1 * | 1/2016 | Wang | .................... | G06F 9/4401 713/1 |

* cited by examiner

Primary Examiner — Kenneth Tang
(74) Attorney, Agent, or Firm — Jackson Walker L.L.P.

(57) ABSTRACT

In accordance with embodiments of the present disclosure, a method may include during boot of an information handling system, obtaining from a management controller integral to the information handling system information regarding resource requirements for one or more peripheral devices communicatively coupled to the one or more processor sockets integral to the information handling system and the management controller. The method may also include determining whether a default allocation of resources for the one or more peripheral devices among the one or more processor sockets by a basic input/output system integral to the information handling system satisfies the resource requirements. The method may further include, in response to determining the default allocation does not satisfy the resource requirements, rebalancing resources among the one or more processor sockets to satisfy the resource requirements prior to enumeration of the one or more peripheral devices.

20 Claims, 2 Drawing Sheets

SYSTEMS AND METHODS FOR REDUCING BIOS REBOOTS

TECHNICAL FIELD

The present disclosure relates in general to information handling systems, and more particularly to methods and systems for reducing occurrences of systems reboot due to BIOS enumeration of information handling resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A key component of almost every information handling system is the basic input/output system (BIOS). A BIOS may be a system, device, or apparatus configured to identify, test, and/or initialize one or more information handling resources of an information handling system, typically during boot up or power on of an information handling system. A BIOS may include boot firmware configured to be the first code executed by a processor of an information handling system when the information handling system is booted and/or powered on. As part of its initialization functionality, BIOS code may be configured to set components of the information handling system into a known state, so that one or more applications (e.g., an operating system or other application programs) stored on compatible media may be executed by a processor and given control of the information handling system and its various components.

During boot time, a BIOS may be responsible for enumeration of information handling resources of the information handling system, including assigning identifying information for the information handling resources (e.g., bus/device/function numbers) and allocating memory-mapped input/output (MMIO) and legacy input/output (I/O) resources. On a cold boot (e.g., information handling system powered on after being powered off) a BIOS may reserve a default range of MMIO and legacy I/O to each processor socket. In some cases, the MMIO or legacy I/O capacity is not sufficient for a particular socket, as may be the case if resource-hungry devices (e.g., graphics processing units) are associated with such socket. BIOS must finish PCI enumeration, a point almost halfway through power-on self-test (POST), in order to discover the resource limitation. In many existing approaches, this would require the BIOS saving the new resource requirements in memory and performing a warm reboot of the information handling system. In the subsequent boot, the BIOS may use the resource requirements stored in memory to rebalance resources among the sockets, and re-initiate POST and enumeration. In addition, while BIOS may retain the resource requirements during subsequent warm boots, it may return to its default values on cold boots, meaning multiple boots may be required during each time power to an information handling system is cycled. Such rebooting may take significant time, and may lead to poor consumer experience.

SUMMARY

In accordance with the teachings of the present disclosure, the disadvantages and problems associated with existing approaches to enumeration of information handling resources may be reduced or eliminated.

In accordance with embodiments of the present disclosure, an information handling system may include one or more processor sockets, a management controller communicatively coupled to the processor and configured to provide out-of-band management of the information handling system, one or more peripheral devices communicatively coupled to the one or more processor sockets and the management controller, and a basic input/output system comprising a program of instructions executable by the processor and configured to cause the processor to initialize one or more information handling resources of the information handling system. The basic input/output system may also be further configured to: during boot of the information handling system, obtain from the management controller information regarding resource requirements for the one or more peripheral devices; determine whether a default allocation of resources for the one or more peripheral devices among the one or more processor sockets satisfies the resource requirements; and in response to determining the default allocation does not satisfy the resource requirements, rebalance resources among the one or more processor sockets to satisfy the resource requirements prior to enumeration of the one or more peripheral devices.

In accordance with these and other embodiments of the present disclosure, a method may include during boot of an information handling system, obtaining from a management controller integral to the information handling system information regarding resource requirements for one or more peripheral devices communicatively coupled to the one or more processor sockets integral to the information handling system and the management controller. The method may also include determining whether a default allocation of resources for the one or more peripheral devices among the one or more processor sockets by a basic input/output system integral to the information handling system satisfies the resource requirements. The method may further include, in response to determining the default allocation does not satisfy the resource requirements, rebalancing resources among the one or more processor sockets to satisfy the resource requirements prior to enumeration of the one or more peripheral devices.

In accordance with these and other embodiments of the present disclosure, an article of manufacture may include a non-transitory computer-readable medium and computer-executable instructions carried on the computer-readable medium. The instructions may be readable by a processor, the instructions, when read and executed, for causing the processor to: during boot of an information handling system, obtain from a management controller integral to the information handling system information regarding resource requirements for one or more peripheral devices communicatively coupled to the one or more processor sockets integral to the information handling system and the management controller; determine whether a default allocation of resources for the one or more peripheral devices among the one or more processor sockets by a basic input/output system integral to the information handling system satisfies the resource requirements; and, in response to determining the default allocation does not satisfy the resource requirements, rebalance resources among the one or more processor sockets to satisfy the resource requirements prior to enumeration of the one or more peripheral devices.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
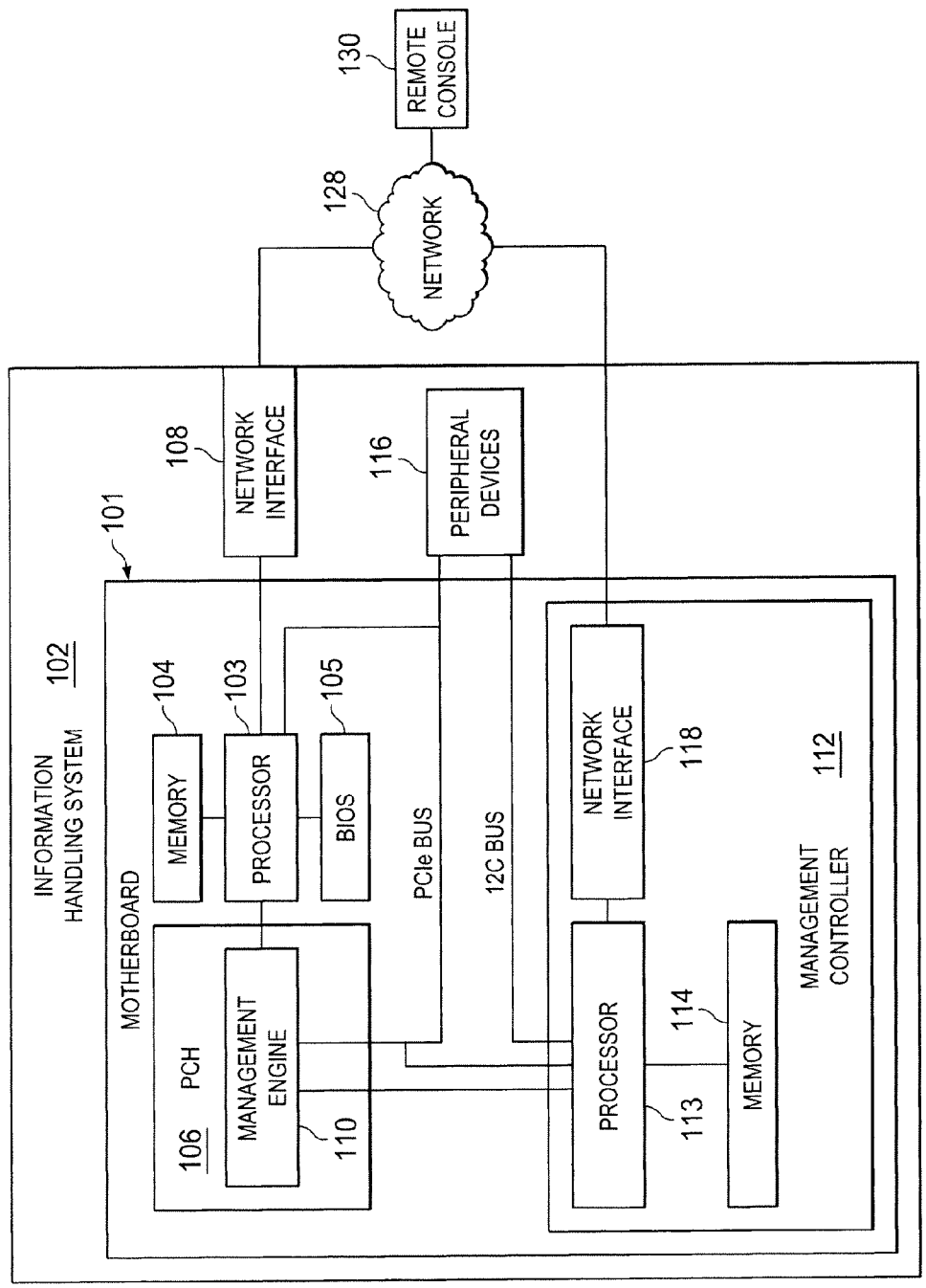
FIG. 1 illustrates a block diagram of an example information handling system, in accordance with embodiments of the present disclosure.
Figure 2:
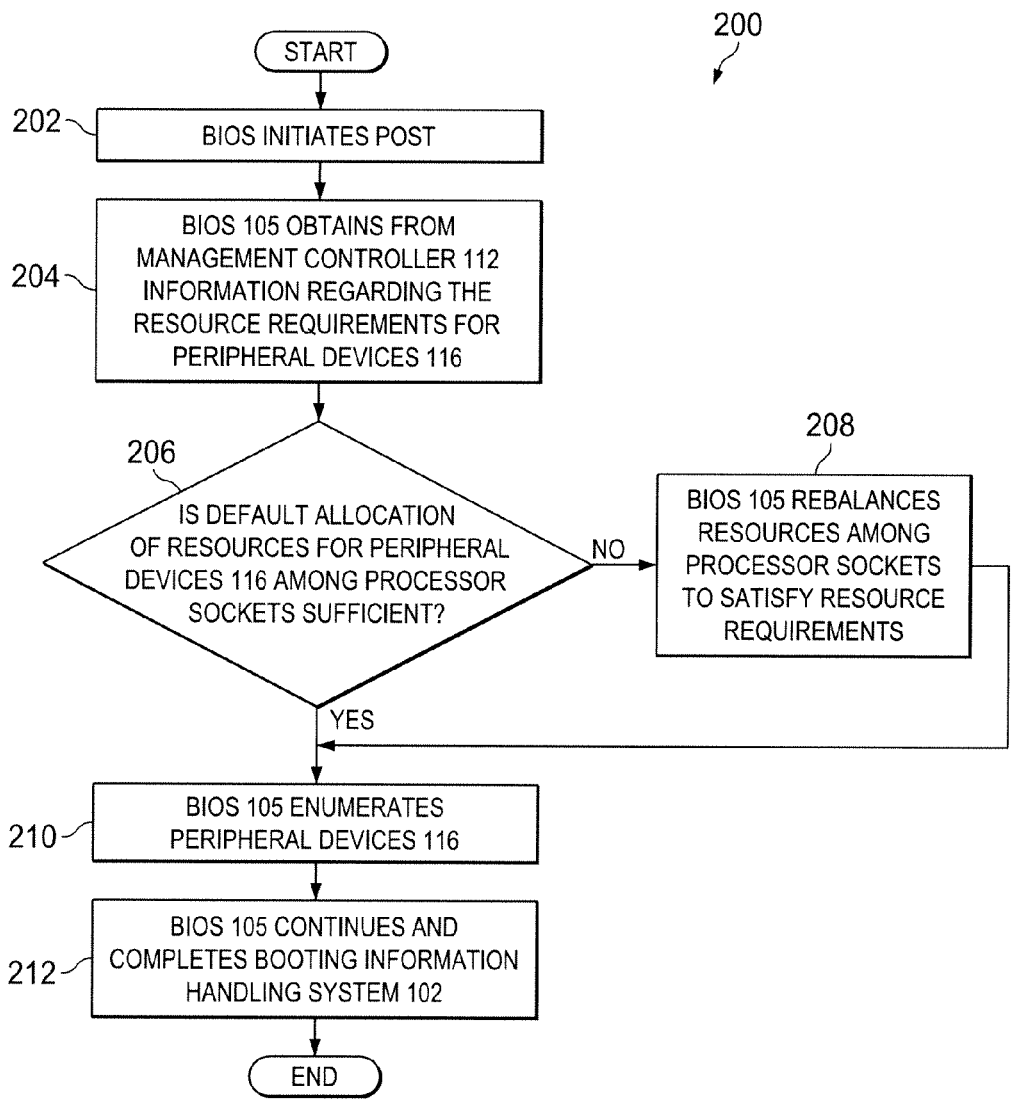
FIG. 2 illustrates a flow chart of an example method for collaboration between a basic input/output system and a management controller, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an information handling system 102.

In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a motherboard 101, a network interface 108 communicatively coupled to a processor 103 of motherboard 101, and one or more peripheral devices 116 communicatively coupled to processor 103.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include processor 103, a memory 104 communicatively coupled to processor 103, a platform controller hub (PCH) 106 communicatively coupled to processor 103, and a management controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. Although memory 104 is depicted in FIG. 1 as integral to motherboard 101, in some embodiments, all or a portion of memory 104 may reside external to motherboard 101.

PCH 106 may be any system, device, or apparatus configured to control certain data paths (e.g., data flow between processor 103, memory 104, and peripherals) and support certain functions of processor 103. A PCH 106 may also be known as a "chipset" of an information handling system 102. One such function may include management engine 110. Management engine 110 may comprise hardware and/or firmware that enables remote out-of-band management for information handling system 102 in order to monitor, maintain, update, upgrade, and/or repair information handling system 102. In some embodiments, management engine 110 may include hardware and firmware compliant with Intel's Active Management Technology.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Management controller 112 may be configured to provide out-of-band management facilities for management of information handling system 102. Such management may be made by management controller 112 even if information handling system 102 is powered off or powered to a standby state. Management controller 112 may include a processor 113, memory 114, and an out-of-band network interface 118 separate from and physically isolated from in-band network interface 108. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. Memory 114 may have stored thereon software and/or firmware which may be read and executed by processor 113 for carrying out the functionality of management controller 112.

Network interface 118 may comprise any suitable system, apparatus, or device operable to serve as an interface between management controller 112, network 128, and/or one or more other information handling systems. Network interface 118 may enable management controller 112 to communicate using any suitable transmission protocol and/or standard. In these and other embodiments, network interface 118 may comprise a network interface card, or "NIC."

Network interface 108 may comprise any suitable system, apparatus, or device operable to serve as an interface between information handling system 102, network 128, and/or and one or more other information handling systems. Network interface 108 may enable information handling system 102 to communicate using any suitable transmission protocol and/or standard. In these and other embodiments, network interface 108 may comprise a network interface card, or "NIC."

Each peripheral device 116 may be communicatively coupled to processor 103 and may generally include any information handling resource. As shown in FIG. 1, peripheral devices 116 may also be coupled to processor 113 via an inter-integrated circuit (I2C) bus and/or via a PCIe bus. Processor 113 can communicate directly to peripheral devices via PCIe except for some messages that require a PCIe root complex. For these messages, management engine 110 may serve as a proxy between processor 113 and peripheral devices 116.

Network 128 may be a network and/or fabric configured to couple information handling system 102, remote console 130, and/or one or more other information handling systems to one another. In these and other embodiments, network 128 may include a communication infrastructure, which provides physical connections, and a management layer, which organizes the physical connections and information handling systems communicatively coupled to network 128. Network 128 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 128 may transmit data via wireless transmissions and/or wireline transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 128 and its various components may be implemented using hardware, software, or any combination thereof.

Remote console 130 may comprise any information handling system including requisite hardware, software, and/or firmware for interfacing with management controller 112 via network interface 118 in order to facilitate remote management of information handling system 102 by remote console 130. In some embodiments, such remote management may be in accordance with Intelligent Platform Management Interface (IPMI) and/or another suitable interface or standard.

In operation, management controller 112 may access peripheral devices 116, even when information handling system 102 is offline or powered down (e.g., for access through I2C) or as soon as the information handling system 102 is powered up (e.g., for access through PCIe), and read the resource requirements of the various peripheral devices 116. Such resource requirements may be obtained by the management controller 112 in any suitable manner. For example, in some embodiments, management controller 112 may access PCIe configuration spaces through management engine 110 proxy for the peripheral devices 116 and read their resource requirements via a PCIe bus using management engine 110 as a proxy. As another example, management controller 112 may, via an I2C bus, read requirements from a field replacement unit (FRU) associated with the peripheral devices. As a further example, management controller 112 may use Management Component Transport Protocol (MCTP) or a similar protocol to query peripheral devices 116 for the resource requirements. As an additional example, intrusion detection functionality of management controller 112 may indicate whether peripheral devices 116 have been added or removed. If no removal or addition of peripheral devices 116 has been made between boots, the resource requirements information maintained by management controller 112 may be used in a subsequent boot, and if peripheral devices 116 have been added or removed, then management controller 112 may re-retrieve resource requirements. Once the resource requirements have been retrieved by management controller 112, management controller 112 may make such information available to BIOS 105 through shared memory (e.g., within memory 104 or 114) or through commands (e.g., Intelligent Platform Management Interface commands). Accordingly, BIOS 105 may obtain resource requirements information from management controller 112 earlier in the boot process, thus potentially reducing the likelihood or need for a reboot after a cold boot to re-enumerate peripheral devices 116.

FIG. 2 illustrates a flow chart of an example method 200 for collaboration between BIOS 105 and management controller 112, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, after system power on, BIOS 105 may initiate POST, including initialization of a chipset (e.g., PCH 106) and memory 104. At step 204, BIOS 105 may obtain from management controller 112 (e.g., via shared memory and/or appropriate commands) information regarding the resource requirements for peripheral devices 116. Management controller 112 may obtain such resource requirements information as described above (e.g., via an I2C bus, reading requirements from a FRU associated with the peripheral devices 116 via I2C bus, querying peripheral devices via MCTP, etc.).

At step 206, BIOS 105 may determine if its default allocation of resources for peripheral devices 116 among processor sockets is sufficient. If so, method 200 may proceed to step 210. If not, method 200 may proceed to step 208.

At step 208, in response to a determination that the default allocation of resources for peripheral devices 116 among sockets is not sufficient, BIOS 105 may rebalance resources among processor sockets to satisfy resource requirements. In these and other embodiments, BIOS 105 may reduce the default allocation if peripheral devices 116 require less memory-mapped I/O than the default allocation.

At step 210, BIOS 105 may enumerate peripheral devices 116. At step 212, BIOS 105 may continue and complete booting information handling system 102. After completion of step 212, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using system 200 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:
1. An information handling system comprising:
   one or more processor sockets;

a management controller communicatively coupled to the one or more processor sockets and configured to provide out-of-band management of the information handling system;
one or more peripheral devices communicatively coupled to the one or more processor sockets and the management controller, wherein the management controller is further configured to query the one or more peripheral devices for respective resource requirements while the information handling system is turned off; and
a basic input/output system comprising a program of instructions executable by a processor of the information handling system and configured to cause the processor to initialize one or more information handling resources of the information handling system, and further configured to:
during boot of the information handling system, obtain from the management controller information regarding the resource requirements for the one or more peripheral devices;
determine whether a default allocation of resources for the one or more peripheral devices among the one or more processor sockets satisfies the resource requirements; and
in response to determining the default allocation does not satisfy the resource requirements, rebalance resources among the one or more processor sockets to satisfy the resource requirements prior to enumeration of the one or more peripheral devices.

2. The information handling system of claim 1, wherein the management controller is coupled to the one or more peripheral devices via an inter-integrated circuit bus.

3. The information handling system of claim 2, wherein the management controller is configured to obtain from one or more field replaceable units associated with the one or more peripheral devices the information regarding resource requirements for the one or more peripheral devices.

4. The information handling system of claim 2, wherein the management controller is configured to obtain via Management Component Transport Protocol from the one or more peripheral devices the information regarding resource requirements for the one or more peripheral devices.

5. The information handling system of claim 1, wherein the management controller is coupled to the one or more peripheral devices via a Peripheral Component Interconnect bus and a management engine of a platform controller hub that serves as a proxy between the management controller and the one or more peripheral devices.

6. The information handling system of claim 5, wherein the management controller is configured to obtain via the Peripheral Component Interconnect bus from one or more configuration spaces associated with the one or more peripheral devices the information regarding resource requirements for the one or more peripheral devices.

7. The information handling system of claim 1, wherein the basic input/output system is configured to obtain from the management controller information regarding the resource requirements for the one or more peripheral devices via one of:
a shared memory of the basic input/output system and the management controller; and
management commands communicated between the basic input/output system and the management controller.

8. A method comprising:
while an information handling system is turned off, a management controller integral to the information handling system querying one or more peripheral devices for respective resource requirements, wherein the one or more peripheral devices are communicatively coupled to one or more processor sockets of the information handling system;
during boot of the information handling system, obtaining from the management controller information regarding the resource requirements for the one or more peripheral devices;
determining whether a default allocation of resources for the one or more peripheral devices among the one or more processor sockets by a basic input/output system integral to the information handling system satisfies the resource requirements; and
in response to determining the default allocation does not satisfy the resource requirements, rebalancing resources among the one or more processor sockets to satisfy the resource requirements prior to enumeration of the one or more peripheral devices.

9. The method of claim 8, wherein the management controller is coupled to the one or more peripheral devices via an inter-integrated circuit bus.

10. The method of claim 9, further comprising obtaining, by the management controller, from one or more field replaceable units associated with the one or more peripheral devices the information regarding resource requirements for the one or more peripheral devices.

11. The method of claim 9, further comprising obtaining, by the management controller, via Management Component Transport Protocol from the one or more peripheral devices the information regarding resource requirements for the one or more peripheral devices.

12. The method of claim 8, wherein the management controller is coupled to the one or more peripheral devices via a Peripheral Component Interconnect bus and a management engine of a platform controller hub that serves as a proxy between the management controller and the one or more peripheral devices.

13. The method of claim 12, further comprising obtaining, by the management controller, via the Peripheral Component Interconnect bus from one or more configuration spaces associated with the one or more peripheral devices the information regarding resource requirements for the one or more peripheral devices.

14. The method of claim 8, wherein obtaining from the management controller information regarding the resource requirements for the one or more peripheral devices comprises obtaining the information via one of:
a shared memory of the basic input/output system and the management controller; and
management commands communicated between the basic input/output system and the management controller.

15. An article of manufacture comprising:
a non-transitory computer-readable medium; and
computer-executable instructions carried on the computer-readable medium, the instructions readable by a processor, the instructions, when read and executed, for causing the processor to:
during boot of an information handling system, obtain from a management controller integral to the information handling system information regarding resource requirements for one or more peripheral devices communicatively coupled to the one or more processor sockets integral to the information handling system and the management controller, wherein the management controller queried the one or more peripheral devices for respective resource requirements while the information handling system was turned off;

determine whether a default allocation of resources for the one or more peripheral devices among the one or more processor sockets by a basic input/output system integral to the information handling system satisfies the resource requirements; and in response to determining the default allocation does not satisfy the resource requirements, rebalance resources among the one or more processor sockets to satisfy the resource requirements prior to enumeration of the one or more peripheral devices.

16. The article of claim 15, wherein the management controller is coupled to the one or more peripheral devices via an inter-integrated circuit bus.

17. The article of claim 16, wherein the management controller is configured to obtain from one or more field replaceable units associated with the one or more peripheral devices the information regarding resource requirements for the one or more peripheral devices.

18. The article of claim 16, wherein the management controller is configured to obtain via Management Component Transport Protocol from the one or more peripheral devices the information regarding resource requirements for the one or more peripheral devices.

19. The article of claim 15, wherein the management controller is coupled to the one or more peripheral devices via a Peripheral Component Interconnect bus and a management engine of a platform controller hub that serves as a proxy between the management controller and the one or more peripheral devices.

20. The article of claim 15, wherein obtaining from the management controller information regarding the resource requirements for the one or more peripheral devices comprises obtaining the information via one of:

a shared memory of the basic input/output system and the management controller; and management commands communicated between the basic input/output system and the management controller.

* * * * *